United States Patent
Podesva et al.

[11] 3,862,987
[45] Jan. 28, 1975

[54] PHENYL-HYDROXYPROPYL-SUBSTITUTED 1-AMINO ADAMANTANES

[75] Inventors: Ctirad Podesva; Carola Solomon, both of Montreal, Quebec, Canada

[73] Assignee: Delmar Chemicals Limited, Ville LaSalle, Quebec, Canada

[22] Filed: July 24, 1973

[21] Appl. No.: 382,107

Related U.S. Application Data

[63] Continuation-in-part of Ser. No. 671,935, Oct. 2, 1967.

[30] Foreign Application Priority Data
Oct. 18, 1966 Great Britain.................... 46575/66

[52] U.S. Cl.......... 260/570.6, 260/570.5 C, 424/330
[51] Int. Cl.............................................. C07c 91/22
[58] Field of Search................................. 260/570.6

[56] References Cited
UNITED STATES PATENTS
3,536,712  10/1970  Keck et al.................... 260/570.6 X Primary Examiner—Robert V. Hines

[57] ABSTRACT

1-Aminoadamantane derivatives of the formula:

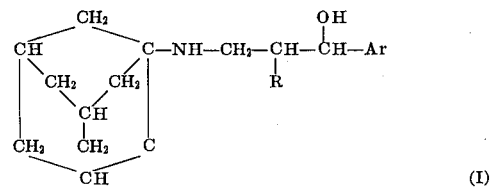

(I)

or pharmaceutically acceptable acid addition salts thereof wherein R is hydrogen or lower alkyl and Ar is an unsubstituted or nitro-, halo-, lower alkoxy- or lower alkyl-substituted phenyl group, are prepared by the reduction of a corresponding $\beta$-adamantanyl-aminoketone or an acid addition salt thereof. The 1-(3-phenyl-3-hydroxypropylamino)-adamantane derivatives show central nervous system activity.

5 Claims, No Drawings

PHENYL-HYDROXYPROPYL-SUBSTITUTED 1-AMINO ADAMANTANES

This application is a continuation-in-part of application Ser. No. 671,935 filed Oct. 2, 1967.

This invention relates to novel 1-(3-phenyl-3-hydroxypropyl) derivatives of 1-aminoadamantane and to the acid addition salts thereof.

The compounds of the present invention can be represented by the following general formula:

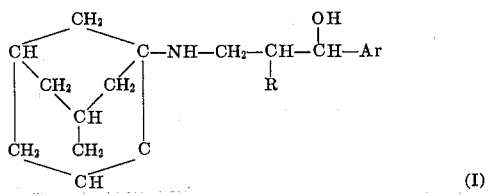

wherein Ar represents an unsubstituted or a substituted phenyl group, the substituents being nitro groups, halogen atoms such as, for example, chlorine or bromine, alkoxy groups such as, for example, methoxy or ethoxy groups, hydroxy groups, lower alkyl groups such as, for example, methyl or ethyl groups, and R represents a lower alkyl group such as, for example, a methyl or ethyl group or hydrogen. In this specification, the term "lower" in the context of "lower alkyl" connotes straight or branched-chain alkyl groups containing 1 to 6 carbon atoms.

The compounds of the present invention may be prepared by a two stage process, wherein, in an initial step 1-aminoadamantane, or preferably an acid addition salt thereof, conveniently its hydrochloride, is reacted with formaldehyde or a polymer thereof and a phenyl alkyl ketone, such as, for example, acetophenone or propiophenone, which in turn may be substituted in the aromatic ring by substituents listed hereinbefore to form the β-adamantanylaminoketones. Thereafter, the ketones are converted into the desired hydroxyl-substituted compounds by reduction. This reduction may be accomplished by any known procedure such as, for example, by reaction with a metal hydride or by catalytic reduction. These hydroxyl-substituted compounds can be transformed into related compounds wherein the hydroxyl group is replaced by a halogen atom or a phenyl or substituted phenyl group according to the preparative methods disclosed in the aforementioned parent application Ser. No. 671,935, filed Oct. 2, 1967.

The products of the present invention show a depressing effect on the central nervous system. For instance, they show a strong depressant and sedative activity when administered in low dosage to mice and especially when administered by injection in suspension. As such, they are of potential value as tranquilizers and sedatives. In this role they can be administered in pharmaceutical form in association or admixture with the usual pharmaceutical carriers.

The bases of the invention can be transformed into equivalent pharmaceutically acceptable acid addition salts, preferred in some cases for ease of administration, by reaction with suitable acids.

DESCRIPTION OF THE PREFERRED EMBODIMENTS

In order that the invention be fully understood, the following examples are given for illustration, but they should not be construed as limiting its scope. The products described were identified by analysis and by spectroscopic methods.

EXAMPLE 1

1-(3-Phenyl-3-hydroxypropylamino)-Adamantane Hydrochloride

Part A 1-(3-Phenyl-3-oxopropylamino)-adamantane

A mixture of 47 g. of 1-aminoadamantane hydrochloride, 33 g. of acetophenone and 30 g. of 37 percent aqueous formaldehyde acdified with 2 ml. of concentrated hydrochloric acid was heated under reflux for 4 hours. After cooling to room temperature, the reaction mixture was diluted with acetone and the crystalline 1-(3-phenyl-3-oxopropylamino)-adamantane was collected by filtration. The pure product had a m.p. of 215°C. after recrystallization from a methanol-ether mixture.

Part B 1-(3-Phenyl-3-hydroxypropyl-Aminoadamantane Hydrochloride

To a solution of 8.9 g. of 1-(3-phenyl-3-oxopropyl)-aminoadamantane in 100 ml. of methanol were added 10 ml. of water and 0.7 g. of sodium borohydride. After standing for 3 hours at room temperature, the reaction mixture was diluted with water and the reaction product was extracted into chloroform. Dry hydrochloric acid gas was introduced into the chloroform extract, the solvent distilled off in vacuo and the residue purified by crystallization from a methanol-ether mixture. The pure 1(3-phenyl-3-hydroxypropylamino)-adamantane hydrochloride had a m.p. of 299° – 302°C.

EXAMPLE 2

1-(3-Phenyl-3-hydroxy-2-methylpropylamino)-Adamantane Hydrochloride.

To a solution of 4 g. of 1-(3-phenyl-3-oxo-2-methylpropylamino)-adamantane hydrochloride, itself prepared by a similar procedure to that set forth in Part A of Example 1, in 40 ml. of methanol was added a solution of 0.23 g. of sodium borohydride in 4 ml. of water. After standing for 2 hours at room temperature, the reaction mixture was diluted with water and the reaction product was extracted with chloroform. Dry hydrogen chloride gas was introduced into the chloroform extract, the solvent distilled off in vacuo and the residue purified by crystallization from methanol. The pure 1-(3-phenyl-3-hydroxy-2-methylpropylamino)-adamantane hydrochloride had a melting point of 306° – 307°C.

EXAMPLE 3

1-[3-(4-Nitrophenyl)-3-hydroxypropylamino]-Adamantane Hydrochloride

A solution of 0.49 g. of sodium borohydride in 30 ml. of water was added to 8 g. of 1-[3-(4-nitrophenyl)-3-oxopropylamino]-adamantane hydrochloride, itself prepared by a similar procedure to that set forth in Part A of Example 1, dissolved in 300 ml. of methanol. The mixture was left to stand at room temperature for 2 hours and thereafter the reaction mixture was further diluted with water and extracted with chloroform. The chloroform extracts were treated with dry hydrogen chloride gas, the solvent distilled off in vacuo therefrom and residue crystallized from a methanol-ethyl acetate mixture. The pure 1-[3-(4-nitrophenyl)-3-hydroxy-propylamino]-adamantane hydrochloride had a melting point of 309° – 310°C.

EXAMPLE 4

1-[3-(4-Methoxyphenyl)-3-hydroxypropylamino]-Adamantane

To a solution of 6.3 g. of 1-[3-(4-methoxyphenyl)-3-oxopropylamino]-adamantane hydrochloride, itself prepared by a similar procedure to that set forth in Part A of Example 1, in 100 ml. of methanol was added a solution of 0.41 g. of sodium borohydride in 10 ml. of water. After leaving the mixture to stand at room temperature for 3 hours, water was added whereupon the product compound precipitated. The crystalline precipitate was collected by filtration and purified by re-crystallization from a methanol-water solution. The pure 1-[3-(4-methoxyphenyl)-3-hydroxypropylamino]-adamantane free base had a melting point of 86° – 87°C.

The following two compounds were prepared by essentially the same procedure as set forth in Part B of Example 1.

1-[3-(4-chlorophenyl)-3-hydroxypropylamino]-adamantane hydrochloride, m.p. 316° – 318°C.

1-[3-(4-methylphenyl)-3-hydroxypropylamino]-adamantane hydrochloride, m.p. 263°C.

What is claimed is:

1. A 1-aminoadamantane derivative of formula I

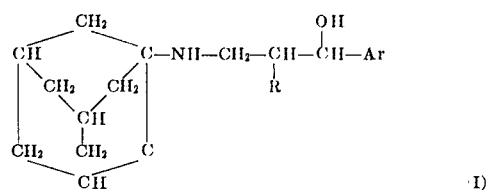

or a pharmaceutically acceptable acid addition salt thereof, wherein Ar represents an unsubstituted phenyl group or a mono-nitro-substituted or mono-halo-substituted or mono-lower alkoxy-substituted or mono-lower alkyl-substituted phenyl group, and R represents a hydrogen atom or a lower alkyl group.

2. 1-(3-Phenyl-3-hydroxypropylamino)-adamantane hydrochloride.

3. 1-(3-Phenyl-3-hydroxy-2-methylpropylamino)-adamantane hydrochloride.

4. 1-[3-(4-Nitrophenyl)-3-hydroxypropylamino]-adamantane hydrochloride.

5. 1-[3-(4-Methoxyphenyl)-3-hydroxypropylamino]-adamantane hydrochloride.

* * * * *